March 28, 1961     J. TALAMONTI     2,977,143
OIL SEAL WITH FILAMENTARY LIP
Filed Oct. 24, 1957
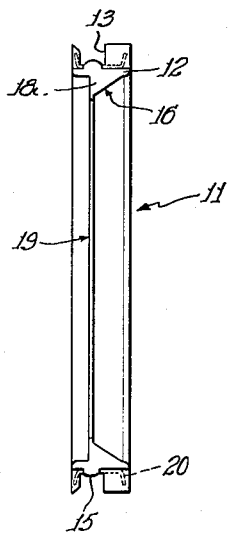
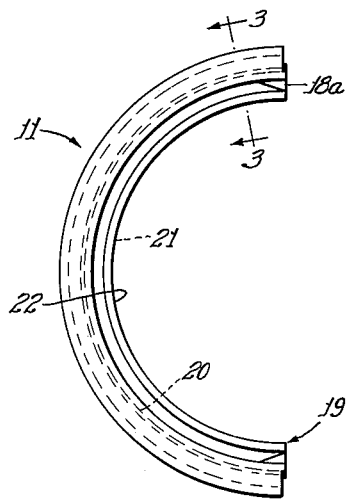
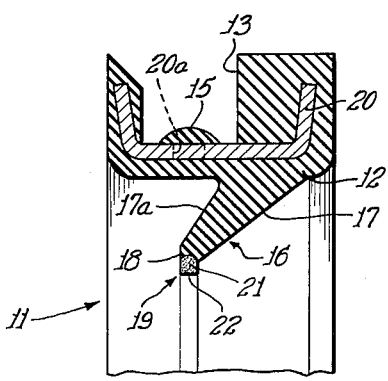
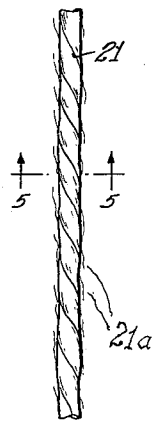
Inventor:
John Talamonti
By: Jones, Darbo + Robertson
Attys.

2,977,143
OIL SEAL WITH FILAMENTARY LIP

John Talamonti, Chicago Heights, Ill., assignor, by mesne assignments, to Borg-Warner Corporation, Chicago, Ill., a corporation of Illinois Filed Oct. 24, 1957, Ser. No. 692,086

1 Claim. (Cl. 288—17)

This invention relates to an improved oil seal or the like for sealing oil or other liquids against leakage around a rotating shaft and more particularly the rear main bearing of the crank shaft of an internal combustion engine.

The present invention, which is particularly adapted for high speed operations, aims to provide an integral wick-like member at the tip of the sealing lip in the form of a filamentary element of porous material in which the filaments or fibers run generally in the arcuate direction of the lip thus affording a localized integral element at the place where it is most effective, which is at the very tip of the sealing lip, and avoiding cross fibers or cross threads thereat.

A piece of ordinary shopping string such as is used for tying packages in stores and the like has been found suitable for the purpose.

It has been found that a string of this kind performs the very desirable function of a wick that draws to itself a body of oil from the inner side of the sealing lip, this oil serving a two-fold function of lubricating the lip to minimize wear and also of providing a sealing film of oil between the lip and the shaft so that the lip itself may actually be out of contact with the shaft, and the film of oil between it and the shaft provides the seal, this film of oil being insured by the wick-like string insert of the present invention. The string, preferably of soft woven cotton, provides a bundle of filaments or fibers loosely woven or twisted together, which by their capillary action draw a supply of oil or such lubricant to the string and entrain the lubricant therein for the purposes herein explained, and which run in the direction of rotation.

The foregoing and other objects and advantages will be apparent from the following description, taken together with the accompanying drawing, of an illustrative embodiment thereof, and in which drawings—

Figure 1 is an axial sectional or diametrical view of a seal embodying the present invention;

Figure 2 is a face view of the seal section looking at the structure of Fig. 1 from the left-hand side thereof;

Figure 3 is an enlarged exaggerated cross-section taken on the line 3—3 of Fig. 2;

Figure 4 is a plan view of the string illustrated for carrying out the present invention; and Figure 5 is an enlarged exaggerated cross-section taken on the line 5—5 of Fig. 4.

Referring in detail to the illustrative construction shown in the drawings, numeral 11 indicates an oil seal of the class described comprising an arcuate elastomer body 12 advantageously molded of synthetic rubber having a high degree of resistance to lubricants and other foreign substances, as well as to heat and cold. A half annulus is here shown and it is to be understood that the seal may be molded in sections each half circular or in a substantially complete circle with a single split therein.

In the outer edge of the arcuate body 12 is provided the usual peripheral groove 13 by which the seal may be mounted to interlock with a marginal flange of an engine block where the rear end of the crank shaft extends, and in the groove 13 may be formed a compression hump 15 to enhance the engagement when the seal is forced onto the engine block flange against the resilience of the elastomer material, the peripheral groove 13 being desirably slightly narrower than the thickness of the engine block flange.

On the inner periphery of the arcuate body 12 is the integral tapered sealing lip 16 which advantageously is tapered on one side, its outer side, as at 17 and slightly less tapered as at 17a on its opposite side, the latter merging into a short straight face 18. At the ends of the arcuate body 12 are the abutment faces 18a, respectively.

The convergence of the two sides 17 and 17a form the sealing lip termination 19, constituted as later described, that defines an arc in a plane radially aligned with the peripheral groove 13.

To reinforce the body 12, particularly if the latter be a half circle, an arcuate metal insert 20 is shown, advantageously of channel form, molded into the body 12, the structure just specifically described being disclosed and claimed in patent to Olin Brummer No. 2,647,002 of July 28, 1953 for "Oil Seal Means or the Like." Insert 20 may have slots 20a therein to provide the hump formation 15.

Further in accordance with the present invention and the specific embodiment here shown, the latter includes the string 21, a section of which as initially appearing is shown separately in Fig. 4, and in exaggerated cross-section in Fig. 5, this being conveniently a piece of shopping string commonly used for tying packages in stores or the like and desirably having the filamentary or fibrous characteristics usefully availed of in the present invention. A piece of string 21 is of a length to extend at least around the half circle defined by and constituting the seal lip termination 19, or around substantially the complete circle if the seal is embodied in a single split annulus.

The string 21 may be readily incorporated with the seal body 12 during the molding of the latter and so as to provide a shaft-contacting edge for the sealing lip, which, as best seen in Fig. 3, may as it runs on the shaft become somewhat flattened out as at 22 from the circle shown in Fig. 5 cross-section, as the seal runs on the shaft, which is to say, as the shaft turns within the seal. The filaments or fibers 21a of the string advantageously run generally in the direction of rotation of the shaft and carry the oil therewith in that direction.

Before molding into the elastomer body of the seal, the string is desirably impregnated with a liquid rubberized bonding agent that colors it to correspond with the body and enhances the bond therewith.

So constructed and arranged, and as previously alluded to, the string 21 acts as a wick that draws a body of oil by capillary action to the sealing lip and entrains the lubricant thereat for enhanced sealing results, while at the same time reinforcing the lips and enhancing its wearing qualities.

It is to be understood that the invention is not limited to the use of shopping string and that the word "string" is used here broadly to include other similar filamentary or fibrous string-like substances.

The invention having been described, what is here claimed is:

An oil sealing member for making rotative sealing engagement with a rotatable shaft, comprising a body of elastomer material having an arcuate pliant free termination sealing lip of reduced axial section, said section being progressively reduced toward the lip free termination and having opposite lateral faces of unequal taper, and a fibrous string carried at and arcuately along the termination of said lip in a position to be next to the shaft, said string being of a diameter narrow axially of the member and having its fibers running generally in the direction of arcuation of the lip, said string diameter being substantially the same dimension as the axial width of the lip termination, said string carrying a rubberized agent bonding it to the lip, whereby said string acts as a relatively axially narrow oil carrying wick for the lip both to effect an oil film between the lip and the shaft and to uniformly lubricate the lip in relative rotative engagement with the shaft.

References Cited in the file of this patent

UNITED STATES PATENTS

| | | |
|---|---|---|
| 1,280,514 | Mann | Oct. 1, 1918 |
| 2,008,682 | Christenson | July 23, 1935 |
| 2,367,403 | Kosatka | Jan. 16, 1945 |
| 2,480,116 | Brummer | Aug. 30, 1949 |
| 2,647,777 | Kosatka | Aug. 4, 1953 |
| 2,736,585 | Riesing | Feb. 28, 1956 |

FOREIGN PATENTS

| | | |
|---|---|---|
| 558,020 | Great Britain | Dec. 15, 1943 |

OTHER REFERENCES

Product Engineering, page 123, March 1932.